(12) United States Patent
Koskinen et al.

(10) Patent No.: US 12,432,617 B2
(45) Date of Patent: Sep. 30, 2025

(54) OPTIMIZED SIGNALING FOR WLAN/3GPP AGGREGATION

(71) Applicant: Nokia Technologies Oy, Espoo (FI)

(72) Inventors: Jussi-Pekka Koskinen, Oulu (FI); Tero Henttonen, Espoo (FI); Daniela Laselva, Klarup (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 102 days.

(21) Appl. No.: 15/559,133

(22) PCT Filed: Mar. 21, 2016

(86) PCT No.: PCT/US2016/023399
§ 371 (c)(1),
(2) Date: Sep. 18, 2017

(87) PCT Pub. No.: WO2016/154106
PCT Pub. Date: Sep. 29, 2016

(65) Prior Publication Data
US 2018/0084458 A1    Mar. 22, 2018

Related U.S. Application Data

(60) Provisional application No. 62/205,596, filed on Aug. 14, 2015, provisional application No. 62/136,113, filed on Mar. 20, 2015.

(51) Int. Cl.
*H04W 28/08* (2023.01)
*H04W 28/18* (2009.01)
(Continued)

(52) U.S. Cl.
CPC ....... *H04W 28/0846* (2020.05); *H04W 28/18* (2013.01); *H04W 88/06* (2013.01); *H04W 84/12* (2013.01)

(58) Field of Classification Search
CPC ..... H04W 28/08; H04W 28/18; H04W 84/12; H04W 88/06
See application file for complete search history.

(56) References Cited

U.S. PATENT DOCUMENTS 9,668,170 B2 * 5/2017 Redana ................ H04W 36/22
9,713,046 B2 * 7/2017 Huang-Fu ......... H04W 36/0085
(Continued)

FOREIGN PATENT DOCUMENTS

EP      2849486 A2     3/2015
WO   2014/071979 A1   5/2014
(Continued)

OTHER PUBLICATIONS

International Search Report and Written Opinion received for corresponding Patent Cooperation Treaty Application No. PCT/US2016/023399, dated Aug. 22, 2016, 25 pages.
(Continued)

*Primary Examiner* — Wutchung Chu
*Assistant Examiner* — Berhanu D Belete
(74) *Attorney, Agent, or Firm* — SQUIRE PATTON BOGGS (US) LLP

(57) ABSTRACT

Various communication systems may benefit from the appropriate aggregation of multiple radio access technologies. For example, certain communication systems may benefit from optimized signaling for wireless local area network and third generation partnership projection aggregation. A method can include determining, by a network element, which parameters according to a first standard are also applicable according to a second standard for aggregation and/or interworking. The method can also include indicating the determined parameters to a user equipment.

9 Claims, 4 Drawing Sheets

(51) Int. Cl.
*H04W 84/12* (2009.01)
*H04W 88/06* (2009.01)

(56) References Cited

U.S. PATENT DOCUMENTS

| | | | | |
|---|---|---|---|---|
| 10,045,264 | B2* | 8/2018 | Huang-Fu | H04W 24/02 |
| 10,182,379 | B2* | 1/2019 | Jheng | H04W 36/165 |
| 11,218,928 | B2* | 1/2022 | Teyeb | H04W 84/12 |
| 2014/0307550 | A1* | 10/2014 | Forssell | H04W 36/22 370/235 |
| 2015/0031367 | A1* | 1/2015 | Singh | H04W 28/0268 455/437 |
| 2015/0043560 | A1* | 2/2015 | Guo | H04W 24/10 370/338 |
| 2015/0078153 | A1* | 3/2015 | Kuo | H04W 28/0942 370/329 |
| 2015/0092745 | A1* | 4/2015 | Roeland | H04W 36/22 370/331 |
| 2015/0249950 | A1* | 9/2015 | Teyeb | H04W 28/08 455/437 |
| 2015/0350990 | A1* | 12/2015 | Fujishiro | H04W 36/22 370/331 |
| 2016/0007268 | A1* | 1/2016 | Jung | H04W 48/08 370/338 |
| 2016/0066245 | A1* | 3/2016 | Vikberg | H04W 36/24 370/331 |
| 2016/0135100 | A1* | 5/2016 | Teyeb | H04W 84/12 370/331 |
| 2016/0192286 | A1* | 6/2016 | Bergstrom | H04W 4/06 370/312 |
| 2016/0219460 | A1* | 7/2016 | Huang-Fu | H04W 76/16 |
| 2016/0219470 | A1* | 7/2016 | Jheng | H04W 48/18 |
| 2016/0219478 | A1* | 7/2016 | Huang-Fu | H04W 28/082 |
| 2016/0242078 | A1* | 8/2016 | Teyeb | H04W 36/0016 |
| 2016/0249253 | A1* | 8/2016 | Redana | H04W 36/22 |
| 2016/0277956 | A1* | 9/2016 | Lindheimer | H04W 36/22 |
| 2016/0295465 | A1* | 10/2016 | Rommer | H04W 36/0027 |
| 2016/0295483 | A1* | 10/2016 | Jung | H04W 28/08 |
| 2016/0316509 | A1* | 10/2016 | Tan Bergstrom | H04W 48/18 |
| 2016/0337903 | A1* | 11/2016 | Cheng | H04W 28/12 |
| 2017/0111822 | A1* | 4/2017 | Jung | H04W 28/08 |
| 2017/0215105 | A1* | 7/2017 | Tan Bergstrom | H04W 48/18 |
| 2018/0092000 | A1* | 3/2018 | Kim | H04W 28/02 |
| 2018/0092147 | A1* | 3/2018 | Pelletier | H04W 12/06 |
| 2022/0086712 | A1* | 3/2022 | Teyeb | H04W 36/0088 |

FOREIGN PATENT DOCUMENTS

| | | | | |
|---|---|---|---|---|
| WO | WO-2014137169 | A1 * | 9/2014 | H04W 24/08 |
| WO | WO-2014168427 | A1 * | 10/2014 | G03B 27/6257 |
| WO | WO-2014175672 | A1 * | 10/2014 | H04W 28/0242 |
| WO | WO-2014182210 | A1 * | 11/2014 | H04W 76/16 |
| WO | WO-2014182211 | A1 * | 11/2014 | H04W 36/0055 |
| WO | WO-2014184347 | A1 * | 11/2014 | H04W 36/0055 |
| WO | WO-2014207253 | A1 * | 12/2014 | H04W 28/0289 |
| WO | WO-2015018487 | A1 * | 2/2015 | H04W 36/14 |
| WO | WO-2015020446 | A1 * | 2/2015 | H04W 48/14 |
| WO | WO-2015024587 | A1 * | 2/2015 | H04W 24/02 |
| WO | WO-2015072752 | A1 * | 5/2015 | H04W 28/08 |
| WO | WO-2016028201 | A1 * | 2/2016 | H04W 24/02 |
| WO | WO-2016138948 | A1 * | 9/2016 | H04W 36/22 |

OTHER PUBLICATIONS

IIT Bombay, "Discussion on Simulation results for suitability of WLAN parameters," 3GPP TSG-RAN WG2 #87, R2-143259, 5 pages.

Intel Corporation, "New Study Item Proposal on WLAN/3GPP Radio Interworking," 3GPP TSG-RAN Meeting #58, RP-122038, 6 pages.

Song et al., Load Balancing for Cellular/WLAN Integrated Networks, IEEE network, IEEE Service Center, New York, NY, vol. 21, No. 1, 18 pages.

European Office Action corresponding to Appln. No. 16 714 148.0, dated Feb. 28, 2019.

"New SI Proposal: LTE-WLAN Radio Level Integration", 3GPP TSG RAN Meeting #66, RP-142281, Agenda: 14.1.2, Intel Corporation, Dec. 8-11, 2014, 8 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.4.1, Dec. 2014, pp. 1-410.

"New WI Proposal: LTE-WLAN Radio Level Integration and Interworking Enhancement", 3GPP TSG RAN Meeting #67, RP-150510, Agenda: 13.1.2, Intel Corporation, Mar. 9-12, 2015, 9 pages.

"Further Details on Interworking Enhancements", 3GPP TSG-RAN WG2 Meeting #91, R2-15xxxx, Agenda: 7.6.3, Nokia Networks, Aug. 24-28, 2015, 4 pages.

"Dedicated Signaling to Carry WLAN Interworking Policy's Assistance Information", 3GPP TSG-RAN WG2 Meeting #83, R2-132797, Agenda: 5.1, Broadcom Corporation, Aug. 19-23, 2013, 4 pages.

Substantive Examination Report Stage I dated Mar. 12, 2020 corresponding to Indonesian Patent Application No. PID201707267, and English translation thereof.

European Office Action issued in corresponding European Patent Application No. 16 714 148.0-1216 on May 26, 2020.

* cited by examiner

WLAN-OffloadConfig information element

```
-- ASN1START

WLAN-OffloadConfig-r12 ::=          SEQUENCE {
    thresholdRSRP-r12                   SEQUENCE {
        thresholdRSRP-Low-r12               RSRP-Range,
        thresholdRSRP-High-r12              RSRP-Range
    }                                                                   OPTIONAL,   -- Need OR
    thresholdRSRQ-r12                   SEQUENCE {
        thresholdRSRQ-Low-r12               RSRQ-Range,
        thresholdRSRQ-High-r12              RSRQ-Range
    }                                                                   OPTIONAL,   -- Need OR
    thresholdChannelUtilization-r12     SEQUENCE {
        thresholdChannelUtilizationLow-r12  INTEGER (0..255),
        thresholdChannelUtilizationHigh-r12 INTEGER (0..255)
    }                                                                   OPTIONAL,   -- Need OR
    thresholdBackhaul-Bandwidth-r12     SEQUENCE {
        thresholdBackhaulDL-BandwidthLow-r12    WLAN-backhaulRate,
        thresholdBackhaulDL-BandwidthHigh-r12   WLAN-backhaulRate,
        thresholdBackhaulUL-BandwidthLow-r12    WLAN-backhaulRate,
        thresholdBackhaulUL-BandwidthHigh-r12   WLAN-backhaulRate
    }                                                                   OPTIONAL,   -- Need OR
    thresholdBeaconRSSI-r12             SEQUENCE {
        thresholdBeaconRSSI-Low-r12         INTEGER (0..255),
        thresholdBeaconRSSI-High-r12        INTEGER (0..255)
    }                                                                   OPTIONAL,   -- Need OR
    offloadPreferenceIndicator-r12      BIT STRING (SIZE (16))          OPTIONAL,   -- Need OR
    t-SteeringWLAN-r12                  T-Reselection,                  OPTIONAL,   -- Need OR
    ...
}

WLAN-backhaulRate ::=       ENUMERATED
                            {r0, r2, r4, r8, r16, r32, r64, r128, r256, r512,
                            r1024, r2048, r4096, r8192, r16384, r32768, r65536,
r131072,
                            r262144, r524288, r1048576, r2097152, r4194304,
r8388608,
                            r16777216, r33554432, r67108864, r134217728, r268435456,
                            r536870912, r1073741824, r2147483648, r4294967295}

-- ASN1STOP
```

Figure 1

OPTIMIZED SIGNALING FOR WLAN/3GPP AGGREGATION

RELATED APPLICATION

This application was originally filed as Patent Cooperation Treaty Application No. PCT/US2016/023399 filed Mar. 21, 2016 which claims priority benefit to U.S. Provisional Patent Application No. 62/136,113, filed Mar. 20, 2015; and U.S. Provisional Patent Application No. 62/205,596, filed Aug. 14, 2015.

BACKGROUND

Field

Various communication systems may benefit from the appropriate aggregation of multiple radio access technologies. For example, certain communication systems may benefit from optimized signaling for wireless local area network and third generation partnership projection aggregation.

Description of the Related Art

The idea of third generation partnership project (3GPP) and wireless local area network (WLAN) radio access network (RAN) aggregation and interworking has been discussed in 3GPP RP-142281, the entirety of which is hereby incorporated herein by reference.

FIG. 1 illustrates a WLAN offload configuration information element description. This is a description corresponding to 3GPP/WLAN interworking in 3GPP release 12 (REL12) specifications. The parameters shown in FIG. 1 are defined in 3GPP technical specification (TS) 36.331 (which is hereby incorporated herein by reference in its entirety) for WLAN offload configuration.

As shown in FIG. 1, various thresholds may be used, including such thresholds as thresholds of reference signal received power (RSRP), reference signal received quality (RSRQ), channel utilization, backhaul bandwidth, and received signal strength indicator (RSSI).

The network (NW) can choose from the above thresholds which it will signal for the UE. The UE can then evaluate the configured thresholds. When all thresholds are fulfilled, the UE can perform traffic steering to/from WLAN/3GPP.

For existing radio resource management (RRM) measurement events, parameters "offset" and "hysteresis" can be applied. Their purpose can be to ensure reliable triggering of a measurement event.

To illustrate, if an offset is applied, the RRM event triggering threshold can be modified by the offset. Such offsets can be specific to certain cells or frequencies, to allow network to have more flexibility and adapt to different conditions. As an example, for event A4, which is defined as Neighbor cell measurement result>Threshold value, with the offset the definition is modified to become Neighbor cell measurement result+offset>Threshold value.

A hysteresis can be applied to avoid small inaccuracies in measurement results in creating a "triggering ping-pong" where an event is first triggered, then cancelled, then triggered again, cancelled again, and so on. Avoiding such occurrences can be done by adding the hysteresis value to the event entering condition and subtracting it from the event exiting condition. As an example, for event A4 again, the entering and exiting condition (disregarding the offset for simplicity here) for the event without hysteresis would be Neighbor cell measurement result>Threshold value. With hysteresis, the entering condition becomes Neighbor cell measurement result+hysteresis>Threshold value, while the exiting condition becomes Neighbor cell measurement result−hysteresis>Threshold value.

SUMMARY

According to a first embodiment, a method can include determining, by a network element, which parameters according to a first standard are also applicable according to a second standard for aggregation and/or interworking. The method can also include indicating the determined parameters to a user equipment.

In a variant, the first standard can be release 12 of the third generation partnership project.

In a variant, the second standard can be release 13 of the third generation partnership project.

In a variant, indicating the parameters can be configured to selectively indicate which parameters according to the first standard should be utilized by a user equipment according to the second standard.

In a variant, the indicating can include signaling a bitmap indicative of differences in user equipment behavior comparing the first standard with the second standard.

In a variant, the indicating can include signaling a single bit indicative of differences in user equipment behavior comparing the first standard with the second standard.

In a variant, the indicating can include signaling a modifier indicative of a difference between a parameter of the first standard and a corresponding parameter of the second standard.

In a variant, the indicating can include providing a 1-bit indication for a parameter of the first standard, indicating that the parameter is to be applied also for the second standard.

In a variant, the indicating can include providing a 1-bit indication for each parameter of a set of parameters of the first standard, indicating that the respective parameter is to be applied also for the second standard.

In a variant, the indicating can include providing an offset and/or hysteresis for a parameter according to the first standard, indicating additional offset and/or hysteresis that a user equipment according to the second standard is expected to apply to the parameter according to the first embodiment.

In a variant, the indicating can include providing a multiplier for a parameter according to the first standard that is configured to modify a corresponding parameter value via multiplication or division.

In a variant, the indicating can include providing an indication as to whether a parameter according to the first standard is to be used for 3GPP/WLAN interworking, aggregation or both.

In a variant, the indicating can include providing an indication as to whether the UE is to perform interworking or aggregation.

In a variant, the indicating can be configured to indicate implicitly that the parameters are to be used for third generation partnership project/wireless local area network aggregation.

The above variants can be used individually or in combination with one another.

According to a second embodiment, a method can include receiving, at a user equipment from a network element, an indication of which parameters according to a first standard are also applicable according to a second standard for aggregation and/or interworking. The method can also include applying the parameters according to the indication at the user equipment.

The various variants of the first embodiment can also be applied to the second embodiment, alone or in combination with one another.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 1 illustrates a WLAN offload configuration information element description.

DETAILED DESCRIPTION

Figure 2A:
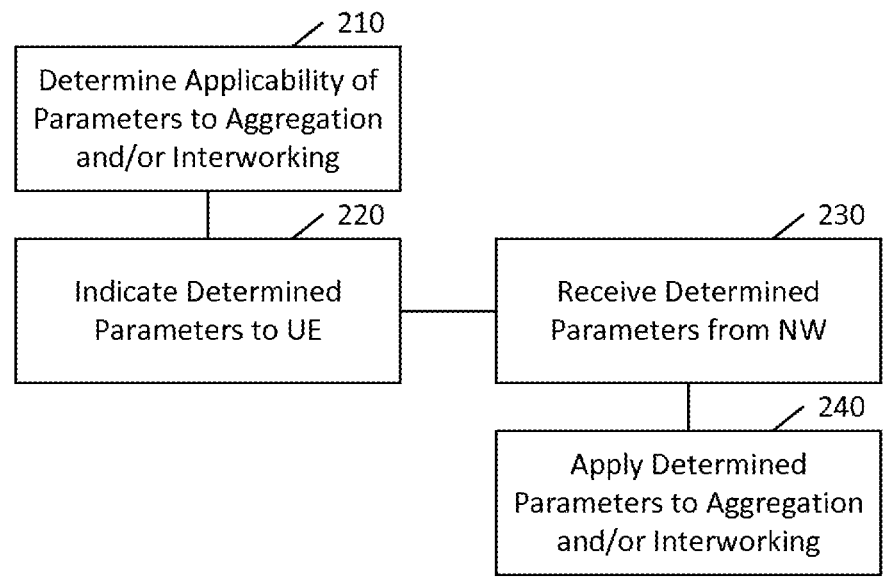
FIG. 2A illustrates a method according to certain embodiments.

Signaling for 3GPP/WLAN aggregation needs to be developed in optimized manner in order to achieve optimized and effective system. It may desirable that both REL-12 WLAN/3GPP interworking and REL-13 WLAN/3GPP aggregation could be active at the same time at least in the network or more specifically on the cell/base station, and even for the individual user equipment (UE). Moreover, it is not clear that the same parameter values are used for UEs utilizing mechanisms of different 3GPP releases. For these and other reasons, certain embodiments may provide a way of efficiently utilizing and extending the existing signaling.

More particularly, certain embodiments provide ways in which it can be indicated which of the Rel-12 parameters is applicable also for the Rel-13 aggregation/interworking mechanisms. This may allow a network to selectively indicate which of the Rel-12 parameters should be utilized also by Rel-13 UEs.

The indication may be a 1-bit, or multiple bits, indication indicating a difference in UE behavior in comparison to the Rel-12 mechanism. Alternatively, or in addition, the indication may be some modifier that indicates how the Rel-13 parameter differs from the Rel-12 parameter. Various examples of possible non-limiting implementation alternatives are discussed below.

The following realizations for the signaling mechanisms can be applied, for example, to 3GPP/WLAN aggregation and/or interworking. As used herein, the term "REL-12 parameter" can refer to any of the parameters or threshold values listed in the ASN.1 shown in FIG. 1.

For example, in certain embodiments, the network can provide a 1-bit indication for a REL-12 parameter, indicating that the parameter is to be applied also for the Rel-13 mechanism. Likewise, in certain embodiments, the network can provide an offset and/or hysteresis for REL-12 parameters, indicating additional offset and/or hysteresis that Rel-13 UE is expected to apply to the Rel-12 parameter.

In certain embodiments, a network can provide a multiplier for a REL-12 parameter that modifies the parameter value via multiplication or division. Moreover, in certain embodiments the network can provide an indication of whether a Rel-12 parameter is used for 3GPP/WLAN interworking, aggregation or both interworking and aggregation.

Furthermore, in certain embodiments the network can provide an indication of whether the UE is supposed to perform interworking or aggregation. The use of a Rel-12 interworking mechanism may, for example, be forbidden when the indication is provided.

Optionally if any of the above information is signaled for the UE it can be considered as implicit indication meaning that the concerned threshold and/or parameter is to be used for REL-13 functionality, such as for 3GPP/WLAN aggregation.

Any combination of the above mechanisms is also possible. The following illustrate certain of the above mechanisms in more detail, although other permutations and combinations of these mechanisms are also permitted.

In one embodiment the NW may signal a true/false indication, for example 1 bit, together with each or some of the REL-12 thresholds/parameters. The indication can indicate whether the threshold and/or parameter is to be used for aggregation or not. For example if the indication for is set to "true" for thresholdRSRP, the UE may use thresholdRSRP for aggregation. For example if the indication is set to "false" for thresholdRSRQ, in certain embodiments the UE may not use thresholdRSRQ for aggregation. The REL-12 thresholds can include, for example, thresholdRSRP, thresholdRSRQ, thresholdChannelUtilization, thresholdBackhaul-Bandwidth, thresholdBeaconRSSI, offloadPreferenceIndicator, and t-SteeringWLAN.

In another embodiment the NW may signal offset and/or hysteresis for each or some of the REL-12 thresholds and/or parameters. The REL-12 thresholds can include, for example, thresholdRSRP, thresholdRSRQ, thresholdChannelUtilization, thresholdBackhaul-Bandwidth, thresholdBeaconRSSI, offloadPreferenceIndicator, and t-SteeringWLAN. The offset and hysteresis may be expressed in various ways for the different parameters.

For example, for thresholdRSRP+/−offset may expressed in dB, while for thresholdRSRQ+/−offset may be expressed in dB. For thresholdChannelUtilization+/−offset may be expressed in integer. The offset may be a difference in the value compared to the Rel-12 signaled value.

For thresholdBackhaul-Bandwidth+/−offset may be expressed in integer. In this case, the offset may indicate, for example, a difference in bitmap position or an absolute value difference rounded to nearest neighbor.

For thresholdBeaconRSSI+/−offset may be expressed in dB, for offloadPreferenceIndicator+/−offset may be expressed in +/−integer, and for t-SteeringWLAN+/−offset may be expressed in seconds. Other ways of expressing offset are also permitted.

In any of these cases, the offset and/or hysteresis parameters may be frequency/cell/radio access technology (RAT)/WLAN identifier specific. For example, these parameters may be applicable only when the frequency/cell/RAT/WLAN identifier matches.

In another embodiment, the NW may signal a multiplier for each or some of the REL-12 thresholds. The REL-12 parameter(s) can then be multiplied or divided with this value. The REL-12 thresholds can include, for example, thresholdRSRP, thresholdRSRQ, thresholdChannelUtilization, thresholdBackhaul-Bandwidth, thresholdBeaconRSSI, offloadPreferenceIndicator, and t-SteeringWLAN+/−.

In another embodiment, the NW may signal an indication indicating whether the concerned parameter is for 3GPP/WLAN interworking, aggregation or both. For example, if the indication for is set to "aggregation" for thresholdBeaconRSSI the UE may use thresholdBeaconRSSI for aggregation. This may also indicate that the threshold is only for aggregation. Thus, for example, the indication can be permissive or mandatory in various embodiments.

In another embodiment, the NW may command the mode the UE shall follow. For example the NW may command the UE to perform interworking or aggregation, which can also mean that the UE is not supposed to use the Rel-12 mechanism.

In another embodiment, if any of the information in the above embodiments is signaled for the UE, this information can be considered as an implicit indication meaning that the concerned threshold/parameter is to be used for REL-13 functionality, such as 3GPP/WLAN aggregation.

In another embodiment, any combination of the above embodiments may be signaled and the UE can comply with all of them.

The above signaling information may be more useful in RRC_CONNECTED state, such as with dedicated signaling, but certain embodiments are not limited to this. The use of the same mechanisms in RRC_IDLE is also permitted using, for example broadcast signaling.

FIG. 2A illustrates a method according to certain embodiments. As shown in FIG. 2A, a method can include, at 210, determining, by a network element, which parameters according to a first standard are also applicable according to a second standard for aggregation and/or interworking. The method can also include, at 220, indicating the determined parameters to a user equipment.

The first standard can be release 12 of the third generation partnership project. The second standard can be release 13 of the third generation partnership project. Releases 12 and 13 are just examples, and certain embodiments can relate to other releases or comparisons between other standards.

The parameters can be configured to selectively indicate which parameters according to the first standard should be utilized by a user equipment according to the second standard.

The indicating can include signaling a bitmap indicative of differences in user equipment behavior comparing the first standard with the second standard. For example, the indicating can include signaling a single bit indicative of differences in user equipment behavior comparing the first standard with the second standard. This may be a single bit per parameter and/or per threshold. For example, the indicating can include providing a 1-bit indication for a parameter of the first standard, indicating that the parameter is to be applied also for the second standard. More particularly, the indicating can include providing a 1-bit indication for each parameter of a set of parameters of the first standard, indicating that the respective parameter is to be applied also for the second standard.

The indicating can include signaling a modifier indicative of a difference between a parameter of the first standard and a corresponding parameter of the second standard. For example, the indicating can include providing an offset and/or hysteresis for a parameter according to the first standard, indicating additional offset and/or hysteresis that a user equipment according to the second standard is expected to apply to the parameter according to the first embodiment. This may be in addition to a normal offset or hysteresis value, as explained above.

In another example, the indicating can include providing a multiplier for a parameter according to the first standard that is configured to modify a corresponding parameter value according to the second standard via multiplication or division.

The indicating can include providing an indication as to whether a parameter according to the first standard is to be used for 3GPP/WLAN interworking, aggregation or both. More generally, the indicating can include providing an indication as to whether the UE is to perform interworking or aggregation.

The indicating can be configured to indicate implicitly that the parameters are to be used for third generation partnership project/wireless local area network aggregation.

The method can also include, at 230, receiving, at the user equipment from the network element, the indication of which parameters according to the first standard are also applicable according to the second standard for aggregation and/or interworking. The method can additionally include, at 240, applying the parameters according to the indication at the user equipment.

In another example embodiment, implicit triggers may be used for UE actions to determine which version of the rules/thresholds/functionalities among the release (Rel) 12 and Rel 13 LTE-WLAN interworking/aggregation (LWI/LWA) to use. That is, a UE implicitly starts following Rel 13 mechanisms upon fulfillment of certain events which can be such as for example the configuration of Rel 13 LWI or WLAN measurement report being triggered.

In an example embodiment, a Rel 13 UE, which is capable of Rel 13 LWA/LWI, does not follow Rel 12 LWI rules and parameters. In another example embodiment, a Rel 13 UE, which is capable of Rel 13 LWA/LWI, follows Rel 12 LWI and will disable it when at least one of the following conditions is fulfilled: 1) upon reception of a measurement configuration for LWI/LWA purpose; 2) upon fulfillment of any measurement event among the ones configured for LWI/LWA purpose; 3) upon the reception of a Rel 13 Traffic Steering Command; 4) upon the UE's upper layers determine successful offloading/onloading based on the received Rel 13 Traffic Steering Command; 5) upon the reception of a Rel 13 LWA configuration.

In another example embodiment, a Rel 13 UE, which is capable of Rel 13 LWA/LWI, was not following Rel 12 LWI, and will start following it when at least one of the following conditions is fulfilled: 1) upon reception of the measurement command which stops measurements for LWI/LWA purpose; 2) upon reception of the LWI/LWA reconfiguration.

Figure 2B:
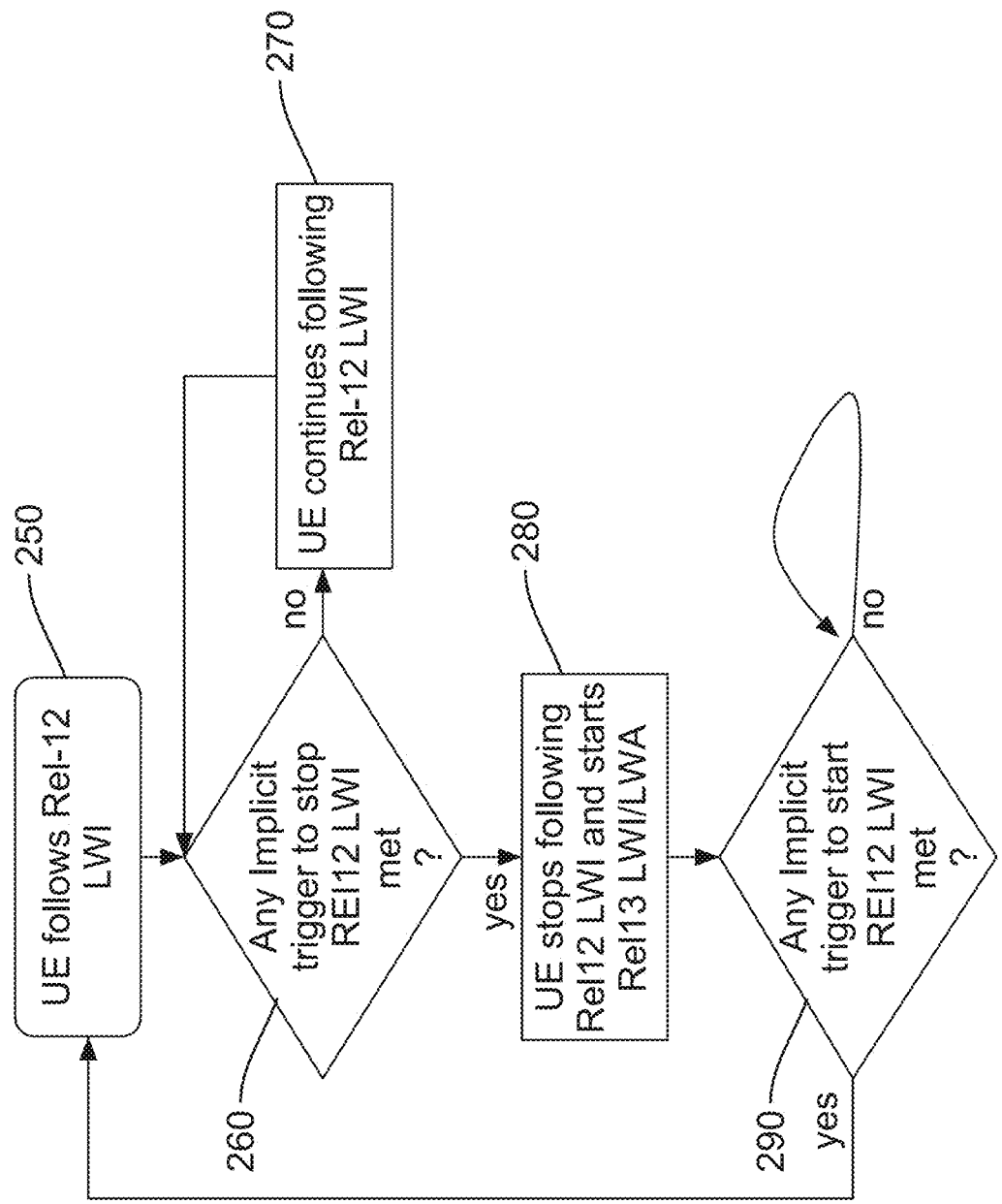
FIG. 2B illustrates another method according to certain embodiments.

FIG. 2B illustrates a method according to certain embodiments. As shown in FIG. 2B, a UE follows Rel 12 LWI at 250. At 260, the UE checks if there is any implicit trigger to stop following Rel 12 LWI. If there is no such trigger, the UE continues following Rel 12 LWI at 270. If there is a trigger, the UE stops following Rel 12 LWI and starts to follow Rel 13 LWI/LWA at 280. At 290, the UE checks whether there is any implicit trigger that may allow the UE to start following Rel 12 LWI again.

Figure 3:
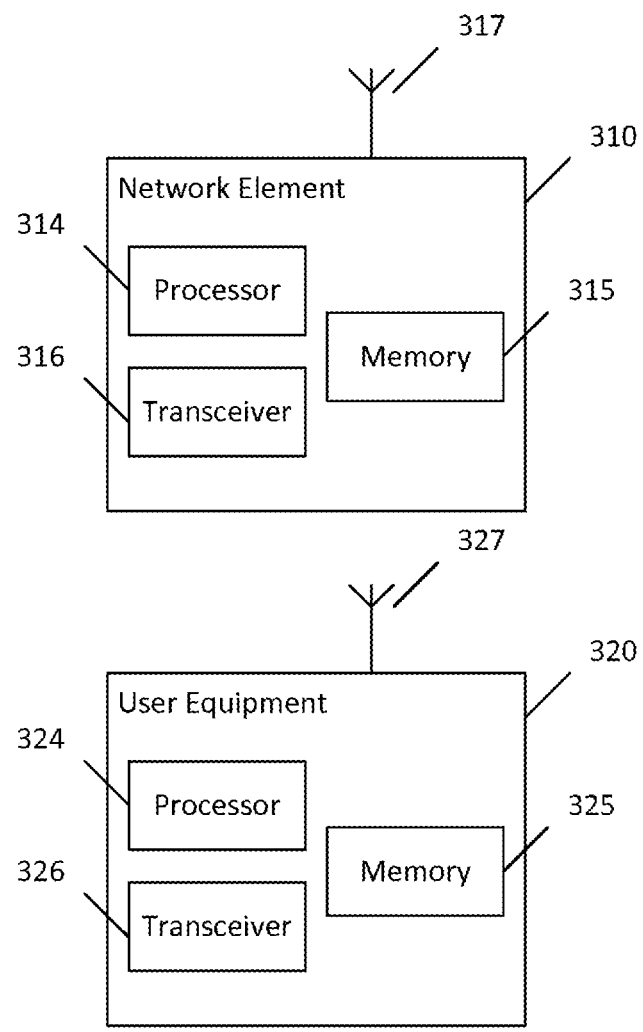
FIG. 3 illustrates a system according to certain embodiments.

FIG. 3 illustrates a system according to certain embodiments of the invention. It should be understood that each block of the flowcharts of FIGS. 2A and 2B may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIGS. 2A and/or 2B.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 2A or 2B). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, in certain embodiments signaling for 3GPP/WLAN aggregation can be optimized for the case when both Rel-12 and Rel-13 mechanisms are used together. Furthermore, in certain embodiments signaling can permit separation of the parameters for Rel-12 and Rel-13 UEs. Additionally, in certain embodiments, REL-12 3GPP/WLAN interworking and REL-13 3GPP/WLAN aggregation can be configured simultaneously.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS eNB enhanced NodeB
RRC Radio Resource Control
RRM Radio Resource Management
SI System Information
UE User Equipment
WLAN Wireless Local Area Network

We claim:

1. A method, comprising:
receiving a traffic steering command at a user equipment; and
changing, responsive to receiving the command, at least one rule or parameter by which the user equipment performs an aggregation and/or interworking mechanism between at least two different radio access networks,
wherein the changing comprises disabling at least one rule or parameter specified by a first standard behavior in favor of at least one rule or parameter specified by a second standard behavior when the traffic steering command is received,
wherein the first standard behavior corresponds to a $3^{rd}$ Generation Partnership Project Release 12 specification, and the second standard behavior corresponds to a $3^{rd}$ Generation Partnership Project Release 13 specification, and
wherein the at least one rule or parameter specified by the $3^{rd}$ Generation Partnership Project Release 12 specification is disabled in favor of the at least one rule or parameter specified by the $3^{rd}$ Generation Partnership Project Release 13 specification when at least one of the following conditions is fulfilled:
upon reception of a measurement configuration for interworking or aggregation,
upon fulfillment of a measurement event among measurement events configured for interworking or aggregation purpose,
upon reception of a traffic steering command specified by the $3^{rd}$ Generation Partnership Project Release 13 specification, or
upon reception of an aggregation configuration specified by the $3^{rd}$ Generation Partnership Project Release 13 specification.

2. The method of claim 1, wherein the at least one rule or parameter is applicable for an interworking mechanism.

3. The method of claim 1, wherein the at least one rule or parameter comprises at least one of the following:
a wireless local area network identifier,
a reference signal received power threshold,
a reference signal received quality threshold, or
a received signal strength indicator threshold.

4. An apparatus, comprising:
at least one processor; and
at least one memory including computer program code,
wherein the at least one memory and the computer program code are configured, with the at least one processor, to cause the apparatus at least to
receive a traffic steering command at a user equipment; and
change, responsive to receiving the command, at least one rule or parameter by which the user equipment performs an aggregation and/or interworking mechanism between at least two different radio access networks,
wherein for changing the at least one rule or parameter, the at least one memory and the computer program code are configured, with the at least one processor, to cause the apparatus to disable at least one rule or parameter specified by a first standard behavior in favor of at least one rule or parameter specified by a second standard behavior when the traffic steering command is received,
wherein the first standard behavior corresponds to a $3^{rd}$ Generation Partnership Project Release 12 specification, and the second standard behavior corresponds to a $3^{rd}$ Generation Partnership Project Release 13 specification, and
wherein the at least one rule or parameter specified by the $3^{rd}$ Generation Partnership Project Release 12 specification is disabled in favor of the at least one rule or parameter specified by the $3^{rd}$ Generation Partnership Project Release 13 specification when at least one of the following conditions is fulfilled:
upon reception of a measurement configuration for interworking or aggregation,
upon fulfillment of a measurement event among measurement events configured for interworking or aggregation purpose,
upon reception of a traffic steering command specified by the $3^{rd}$ Generation Partnership Project Release 13 specification, or
upon reception of an aggregation configuration specified by the $3^{rd}$ Generation Partnership Project Release 13 specification.

5. The apparatus of claim 4, wherein the at least one rule or parameter is applicable for an interworking mechanism.

6. The apparatus of claim 4, wherein the at least one rule or parameter comprises at least one of the following:
a wireless local area network identifier,
a reference signal received power threshold,
a reference signal received quality threshold, or
a received signal strength indicator threshold.

7. A computer program product comprising a non-transitory computer-readable medium bearing computer program code embodied therein for use with a computer, the computer program code comprising
code for receiving a traffic steering command at a user equipment; and
code for changing, responsive to receiving the command, at least one rule or parameter by which the user equipment performs an aggregation and/or interworking mechanism between at least two different radio access networks,
wherein the code for changing the at least one rule or parameter, comprising code for disabling at least one rule or parameter specified by a first standard behavior in favor of at least one rule or parameter specified by a second standard behavior when the traffic steering command is received,
wherein the first standard behavior corresponds to a $3^{rd}$ Generation Partnership Project Release 12 specification, and the second standard behavior corresponds to a $3^{rd}$ Generation Partnership Project Release 13 specification, and
wherein the at least one rule or parameter specified by the $3^{rd}$ Generation Partnership Project Release 12 specification is disabled in favor of the at least one rule or parameter specified by the 3$^{rd}$ Generation Partnership Project Release 13 specification when at least one of the following conditions is fulfilled:
  upon reception of a measurement configuration for interworking or aggregation,
  upon fulfillment of a measurement event among measurement events configured for interworking or aggregation purpose,
  upon reception of a traffic steering command specified by the 3$^{rd}$ Generation Partnership Project Release 13 specification, or
  upon reception of an aggregation configuration specified by the 3$^{rd}$ Generation Partnership Project Release 13 specification.

8. The computer program product of claim 7, wherein the at least one rule or parameter is applicable for an interworking mechanism.

9. The computer program product of claim 7, wherein the at least one rule or parameter comprises at least one of the following:
  a wireless local area network identifier,
  a reference signal received power threshold,
  a reference signal received quality threshold, or
  a received signal strength indicator threshold.

* * * * *